United States Patent

[11] 3,557,725

[72] Inventor Kenneth W. Stookey
  Markle, Ind.
[21] Appl. No. 840,797
[22] Filed July 10, 1969
[45] Patented Jan. 26, 1971
[73] Assignee Torrax Systems, Inc.
  North Tonawanda, N.Y.
  a corporation of Delaware. by mesne assignments to

[54] FURNACE EMISSION CONTROL SYSTEM
  15 Claims, 1 Drawing Fig.
[52] U.S. Cl. ................................. 110/10, 122/2
[51] Int. Cl. .................................. F23g 5/12
[50] Field of Search ...................... 110/8, 10; 122/2

[56] References Cited
  UNITED STATES PATENTS
  3,340,830 9/1967 Frey et al. ............ 110/10X
  3,393,652 7/1968 Connell ............... 122/2X
  3,482,533 12/1969 Ankersen ............. 110/10

Primary Examiner—Kenneth W. Sprague
Attorney—Karl W. Brownell

ABSTRACT: The invention pertains to a furnace emission control system, especially for a vertical furnace charged at the top and having a heated well at the bottom in which hot gases are drawn off from an intermediate point along the furnace and supplied to an igniter for secondary combustion therein with the gases discharged from the igniter being passed through a waste heat boiler and then through an induced draft fan and then through a bag filter or precipitator to the atmosphere. The gas flow throughout the system is maintained so that the furnace above the gas outlet therein is at subatmospheric temperature and so that gas flow will be maintained into the igniter. The oxygen content of the gases discharged from the waste heat boiler is sampled and secondary air is admitted to the igniter in conformity therewith. The temperature of the gases from the igniter is sampled and supplementary fuel may be supplied to the igniter to maintain minimum safe operating temperature. Controls are provided to bypass gases above a predetermined temperature away from the bag filter and to maintain the igniter temperature above a predetermined minimum.

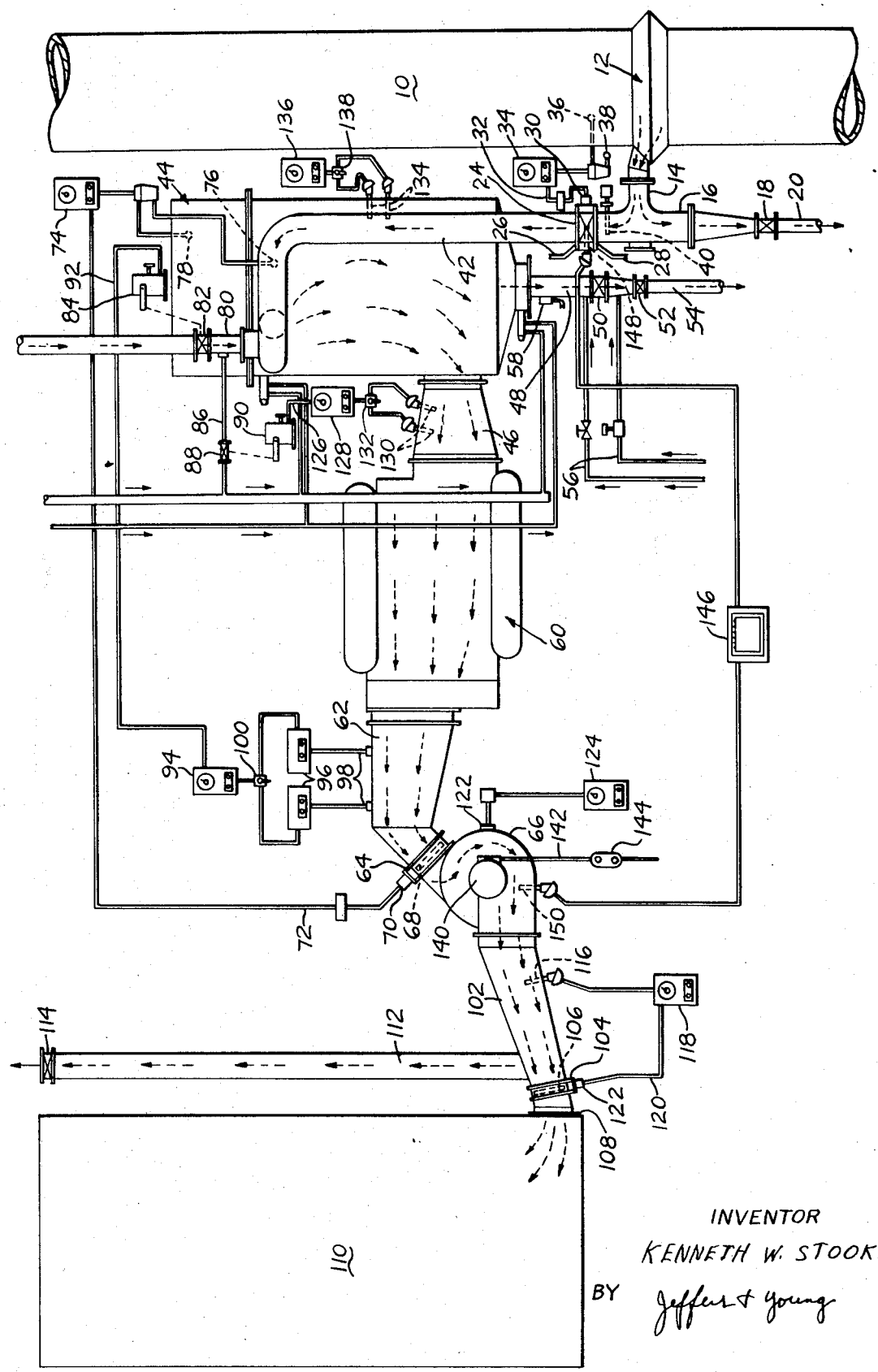

FURNACE EMISSION CONTROL SYSTEM

The present invention pertains to a furnace emission control system, especially for a vertical furnace charged at the top and having a hot well at the bottom.

Furnaces of the nature referred to are to be employed for disposing of waste materials such as trash and the like collected in urban areas. Such trash is composed of combustible material such as paper and organic materials but also includes noncombustibles such as metal and glass and other inorganics. The combustible materials can be burned to completion and the noncombustible meltable materials can be reduced to a sterile slag. When ignited, combustible materials are treated in a vertical shaft furnace by the addition of air at the bottom of the furnace, or its hearth. Complete combustion can not take place here once the carbon residue has attained a temperature in excess of 2,000° F./2,100° F. $CO_2$ can not exist under these conditions since it will pick up another atom of carbon to become 2CO and with an absorption of heat. The excess of sensible heat liberated in the hearth zone, will be carried upwardly by the gases through the burden to preheat it. This will drive off any free water contained by the burden as well as combustible hydrocarbon gases and vapors by thermal decomposition of portions of the burden. Some particulate will also be contained in the fume as it is discharged from the gasifier into the igniter.

With the foregoing in mind, the present invention has as a primary objective the provision of a system for controlling the emissions from a furnace so as to eliminate therefrom noxious or toxic fumes and to eliminate fines therefrom by completely burning all of the combustible gases, vapors and odors, with a final filtering of the particulate in a bag house or electrostatic precipitator.

Another object of this invention is the provision of a control arrangement for use with a system of the nature referred to by means of which it can be maintained in automatic and highly efficient operation at all times.

A still further object is the provision of safety devices in the arrangement which will prevent the developing of dangerous conditions therein upon the failure of an operative or control component of the arrangement or system.

The foregoing objects and advantages of the present invention as well as other objects and advantages thereof will become more apparent upon reference to the following detailed specification taken in connection with the accompanying drawing which schematically illustrates an emission system having a control arrangement according to the present invention incorporated therewith.

DETAILED DESCRIPTION

In the drawing 10 is a furnace of the type illustrated in copending application Ser. No. 719,300 filed Mar. 25, 1968. This furnace is adapted for being charged from the upper end and at the lower end has a well and hearth in which a high temperature is maintained by a hot air blast, said temperature of the blast air being on the order of as much as 2,000° F. The products of combustion from the hearth rise upwardly through the furnace and the material charged into the furnace. This may be waste materials containing both combustible material and noncombustible material which will move downwardly within the furnace and the burning of the combustible component thereof can raise the temperature in the furnace in the hearth to as high as around 4,000° F. The noncombustible component of the material charged into the furnace will be reduced to slag form which can be tapped from the furnace well.

Due to the extremely high temperatures within the furnace, an atmosphere of carbon monoxide is created therein and the carbon monoxide, together with other gases and vapors with entrained fines are drawn off from the furnace through a drawoff connection or gas outlet at 12 intermediate the top and bottom of the furnace. Drawoff connection or gas outlet 12 is maintained at a slight subatmospheric pressure so that the furnace above the outlet is also at subatmospheric pressure and gases and fume do not pass out through the open top of the furnace.

Leading from connection 12, which may be in the form of collector ring, is a conduit 14 which has a branch conduit 16 leading downwardly and through a valve 18 to a discharge conduit 20. Branch conduit 16 received solids of such character as to cause them to drop out of the gas stream. Branch conduit 16, as will be seen hereinafter, also receives the output from a steam aspirator 40 which is made effective when it becomes necessary to block the gas outlet 14 for some reason. Conduit 14 has a second branch conduit 42 extending upwardly and having a control valve 24 disposed therein. This control valve is advantageously water cooled by water supplied thereto via a supply conduit 26 and drained therefrom via a drain conduit 28. The valve is operated in its opening and closing movements by an air pressure actuated operator 30 supplied with pressure via a conduit 32 leading from a controller 34. Controller 34 is sensitive to the difference in pressure between point 36 in the furnace above the drawoff connection 12 and the atmosphere, indicated by point 38. The object of controller 34 is to maintain the furnace above connection 12 at subatmospheric pressure so that hot gases will not pass out the top of the furnace.

The valve 24 can move from a position of maximum opening to a position of minimum opening which is less than completely closed.

Located in branch conduit 22 on the upstream side of valve 24 is a steam aspirator 40 which becomes operable when valve 24 is closed to its minimum position and an induced draft exhaust fan, to be subsequently described, is turned off. Steam aspirator 40 injects steam into branch conduit 22 and thus prevents the accumulation of explosive gases on the upstream side of valve 24. As mentioned, aspirator 40 discharges into branch conduit 16.

The downstream side of valve 24 is connected via conduit 42 with the inlet of an igniter or secondary combustion chamber generally indicated at 44 and which is more fully disclosed and described in copending application Ser. No. 719,300 filed Mar. 25 1968, now U.S. Pat. No. 3,511,194. In brief, the hot gases from conduit 42 enter the upper end of igniter 44 in a tangential direction and swirl therein and move downwardly therein while burning and the gaseous products of combustion, and fines carried thereby, are discharged laterally from the igniter near the bottom via a duct or conduit 46.

At the extreme lower end of igniter 44 there is a collector chamber 48 for solid products of combustion that drop from the gas stream in the igniter, said collector also being shown and described more fully in the above identified U. S. Pat. No. 3,511,194. The collector 48 has a pair of spaced valves 50 and 52 therein with the latter communicating with a discharge conduit 54. Water is maintained in collector 48 by the valved waterlines 56 to prevent any air from entering the bottom of igniter 54. The extreme lower end of the igniter is sealed from the atmosphere via a water seal arrangement partially shown at 58.

Duct 46 enters the inlet end of a waste heat boiler generally indicated at 60 and which extracts heat from the hot gases passing therethrough in a manner well-known in the art of waste heat boilers. The outlet for cooled gases from the waste heat boiler is connected to a conduit 62.

Conduit 62 leads through a flow controller or valve 64 to the inlet of an induced draft exhaust fan 66. Flow controller 64 comprises vanes 68 adjustable with regard to their angular disposition in the flow passage by an air pressure actuated operator 70 which is supplied with air via a conduit 72. Conduit 72 leads to a second controller 74 which is sensitive to the differential pressure between point 76 on conduit 42 and point 78 in the upper end of igniter 44. The controller 74 operates to maintain a differential pressure between points 76 and 78 so that the gases in conduit 42 will be drawn into the igniter and also to insure the drawing into the igniter of secondary air and fuel. If there is a rise in pressure at point 76, vanes 68 of valve 64 will be opened thereby increasing the gas flow in the system and increasing the rate at which gases are drawn into the igniter.

Connected with conduit 42 just ahead of the connection of the conduit to the igniter is an air supply conduit 80 having a valve 82 therein actuated in opening and closing movements by air motor 84. Connected to conduit 80 on the downstream side of valve 82 is a fuel supply conduit 86 having a control valve 88 therein operated in opening and closing movements by an air motor 90.

Actuating air is supplied to air motor 84 via a conduit 92 leading to still another controller 94 which is sensitive to the oxygen analyzers 96. Each analyzer 96 is connected by connections 98 to duct 62 so as to take samples therefrom. When the samples taken indicate the need for oxygen, valve 82 will be opened and, when the oxygen content of the sample is too high, valve 82 will close to a predetermined minimum position. The controller 94 is adjusted to maintain a slight excess in oxygen in duct 62 in order to insure complete combustion in igniter 44.

Two of the analyzers 96 are provided with a selector switch 100 being provided for selectively connecting the analyzers to controller 94 thereby to avoid loss of the sampling operation. If the active analyzer becomes inoperative, an alarm signal will be activated and selector valve 100 can be adjusted to make the other analyzer operative. If both analyzers become inoperative at the same time, fan 66 will shutdown and valve 24 will be closed to its minimum position and the safety valves in the gas lines will close. The valve 82, as mentioned, only closes to a predetermined minimum position so that in the event of such a shutdown, air can still flow through valve 82 and downwardly through conduit 42 and through valve 24 and assist the steam aspirator in removing the explosive gases from conduit 14. This is necessary because furnace 10 cannot be shutdown in a short time once it has been started.

Fan 66 discharges into a discharge duct 102 leads through a valve 104 having tiltable vanes 106 to the inlet 108 of a bag filter 110. Within bag filter 110 are multiple bags which will catch the fines and other particles carried by the gas stream so that only the cleaned, oxidized gases will pass through the bag and be emitted to the atmosphere, for example, from the top thereof at 110. Due to the complete oxidation of the gases, all noxious and toxic substances that might have been entrained in the gases drawn from furnace 10, are oxidized to harmless condition and pollution of the atmosphere is thereby prevented.

Leading upwardly from duct 102 ahead of valve 104 is the duct 112 having an overbalanced swing valve 114 at the upper end thereof. Swing valve 114 is normally closed but upon pressure in duct 102 exceeding a predetermined amount, valve 114 will open and pass the discharge from fan 66 directly to the atmosphere.

Located in duct 102 is a thermocouple 116 for measuring the temperature of the gases in duct 102. Thermocouple 116 is connected in controlling relation to controller 118 which controls the supply of waste gases to conduit 120 which is connected with pneumatic operator 122 for tilting vanes 106 of valve 104. This control is necessary to prevent gases above a predetermined temperature from being introduced into bag filter 110. If the preset temperature is exceeded, vanes 106 will move toward closed position and valve 114 will open, due to the pressure built up in conduit 112, and bypass the gases directly to the atmosphere. Closing of vanes 106 is accompanied by the energization of an alarm to indicate the condition to the attendant.

Pertaining to fan 66 is a vibration monitoring element 122 and connected to the element is a controller 124 sensitive to a predetermined level of vibration. When the vibration level of fan 66 exceeds a predetermined amount, an alarm will be energized and, after a predetermined time delay, if the vibration level does not reduce, fan 66 will automatically be shutdown and at this time valve 24 will move to its position of minimum opening and steam aspirator 40 will be actuated.

With regard to pneumatic motor 90 pertaining to gas valve 88, this motor is actuated by air supplied thereto via a conduit 126 and to which air is supplied from a controller 128. Controller 128 is made sensitive to the temperature of the gas passing through duct 46. To this end thermocouples 130 are provided in duct 46 which can be selectively connected to the controller by actuation of a selector switch 132.

If the temperature of the gases in duct 46 drops below a predetermined level, valve 88 will open to supply additional gas, natural gas, for example, through conduit 86 to duct 80 and thence into duct 42 and igniter 44. Any failure occurring in thermostats 130, or controller 128, or in the supply of air to the controller, will cause valve 88 to close.

The temperature of the refractory wall of the igniter is also monitored and this is accomplished by thermocouples 134 imbedded in the igniter wall toward the discharge end thereof. Thermocouples 134 are selectively connectable with a controller 136 by a selector valve 138. Reduction in the temperature of the igniter wall below that to sustain combustion will bring about closing of valve 24 to its minimum position and shutting off of induced draft fan 66 and closing of the safety shutoff valves of the fuel. This will prevent gases from entering the actuate when the igniter wall temperature is not high enough to cause ignition of the gases. Operation of controller 136 in this manner will also actuate a suitable alarm.

Controller 136 is also sensitive to increasing temperature of the refractory wall of the igniter for energizing another alarm when the temperature of the refractory igniter wall rises above a predetermined maximum. With the thermocouples 134 imbedded in the refractory wall of the igniter, a certain thermal lag will occur ad this will permit normal fluctuation of the wall temperature without actuating controller 136.

The induced draft fan 66 is provided with a drive motor 140 having an energizing circuit 142 with a start-stop push bottom station 144. The energizing circuit for motor 140 is interconnected with valve 24 so that whenever motor 140 is deenergized, either by actuation of push button 144, or for any of the other reasons given above, valve 24 will immediately move to its minimum opening position.

A multipoint recorder 146 is provided having a first sensor 148 associated with valve 24 to monitor the temperature of the cooling water being discharged therefrom and a second sensor 150 associated with the bearings of fan 66. Recorder 146 not only records the temperatures detected by its sensors 148 and 150 but will also energize alarms in case either of the temperatures exceeds a predetermined maximum limit allowed for the respective sensed region.

I claim:

1. An emission control system for a combustion arrangement, said arrangement including a vertical furnace chargeable near the top with material to be treated and having a fired hearth near the bottom and having a lateral gas outlet between the top and bottom, a secondary combustion chamber having a tangential inlet near the top connected by a first conduit to said gas outlet of said furnace and also having a lateral outlet near the bottom, a waste heat boiler having a hot gas inlet connected by a second conduit with said lateral outlet of said secondary combustion chamber and also having a cooled gas outlet, a fan having an inlet connected by a third conduit to the cooled gas outlet of said waste heat boiler and also having an outlet, and a filter having an inlet connected by a fourth conduit with said fan outlet for receiving gas to be filtered and discharging filtered gas to the atmosphere; said control system comprising: a first valve in said first conduit; a second valve in said third conduit; a third valve in said fourth conduit; first, second and third operators connected to said first, second and third valves respectively and operable in conformity with the supply of energy thereto for controlling said valves in opening and closing movements to regulate the flow of gas in the respective conduits; and first, second and third controllers connected to said first, second and third operators respectively for controlling the supply of energy thereto.

2. An emission control system according to claim 1 in which said first controller is sensitive to the difference in pressure between atmospheric pressure and the pressure in said furnace in the region thereof above said lateral gas outlet of the furnace and regulates the supply of energy to said first operator so as to control said first valve in opening and closing movements to maintain the said pressure in the said region of the furnace below that of the atmosphere.

3. An emission control system according to claim 1 in which said second controller is sensitive to the difference in pressure between the pressure in the upper end of said secondary combustion chamber and the pressure in said first conduit on the downstream side of said first valve and regulates the supply of energy to said second operator to control said second valve in opening and closing movements so as to maintain the said pressure in the upper end of the second combustion chamber below that in the said first conduit downstream of said first valve.

4. An emission control system according to claim 1 in which said third controller is sensitive to the temperature of the gas in said fourth conduit and regulates the supply of energy to said third operator so as to close said third valve when the gas temperature in said fourth conduit exceeds a predetermined amount.

5. An emission control system according to claim 4 which includes a bypass conduit connected to said fourth conduit upstream of said third valve and leading to the atmosphere, and a normally closed valve in said bypass conduit responsive to a predetermined pressure developed in said fourth conduit when said third valve closes for opening an bypassing the discharge from said fan directly to the atmosphere.

6. An emission control system according to claim 1 which includes fuel and air conduits connected to said first conduit near said secondary combustion chamber for supplying fuel and air to the gas stream entering said second combustion chamber, fuel and air control valves in said fuel and air conduits respectively, respective operators connected to said fuel and air valves and responsive to a supply of energy thereto for adjusting said fuel and air valves in opening and closing movements respectively, and respective controllers connected to the operators for said fuel and air valves for controlling the supply of energy thereto.

7. An emission control system according to claim 6 in which the said controller for operator for the fuel control valve is sensitive to the temperature of the gas flowing in said second conduit and supplied energy to the respective operator to adjust the fuel valve so as to maintain the temperature in said second conduit substantially constant.

8. An emission control system according to claim 6 in which the said controller for the operator for the valve in said air supply conduit is sensitive to the oxygen content of the gas flowing in said third conduit and is operable for controlling the supply of energy to the respective operator for adjusting the valve in the air supply line to maintain said oxygen content in the gas flowing in said third conduit within predetermined limits.

9. An emission control system according to claim 2 in which said first controller pertaining to the said first operator for said first valve is also sensitive to the wall temperature in said secondary combustion chamber and is operable for supplying energy to the pertaining operator to move the said first valve toward closed position when the temperature of the wall of said secondary combustion chamber falls below a predetermined minimum amount.

10. An emission control system according to claim 9 in which said first valve has a position of minimum closure, a steam aspirator in said first conduit on the upstream side of said first valve and a discharge conduit into which said steam aspirator discharges, and means for actuating said steam aspirator when said fist valve is moved to its minimum closure position whereby the accumulation of explosive gases on the upstream side of said first valve is prevented when in its position of minimum closure.

11. An emission control system according to claim 10 which includes a control circuit for controlling the operation of said fan, and means responsive to the shutting down of the fan to actuate said first operator to move said first valve to its position of minimum closure while also actuating said steam aspirator.

12. An emission control system according to claim 11 in which the shutting down of said fan is also accompanied by actuation of the operator for said fuel control valve to cause closing of said fuel supply valve.

13. An emission control system according to claim 12 which includes vibration detecting means pertaining to said fan and operable upon vibrations developed in said fan reaching a predetermined amount and persisting for a predetermined length of time to shutdown said fan.

14. An emission control system according to claim 2 in which said first valve is water cooled and means is provided sensitive to the temperature of said valve and operable at ta predetermined maximum temperature thereof to actuate said first operator to move said first valve to its position of minimum closure while simultaneously actuating said steam aspirator.

15. An emission control system for a combustion arrangement, said arrangement including a vertical furnace changeable near the top with material to be treated and having a fired hearth near the bottom and having a lateral gas outlet between the top and bottom, a secondary combustion chamber having a tangential inlet near the top connected by a first conduit to said gas outlet of said furnace and also having a lateral outlet near the bottom, a waste heat boiler having a hot gas inlet connected by a second conduit with said lateral outlet of said secondary combustion chamber and also having a cooled gas outlet, a fan having a cooled gas outlet, a fan having an inlet connected by a third conduit to the cooled gas outlet of said waste heat boiler and also having an outlet, and a filter having an inlet connected by a fourth conduit with said fan outlet for receiving gas to be filtered and discharging filtered gas to the atmosphere, said control system comprising; means for maintaining subatmospheric pressure in said furnace in the region above the said gas outlet therein, means for maintaining the temperature and the oxygen content of the gas discharge from said secondary combustion chamber within predetermined limits, means for bypassing gas away from the inlet of said filter when said gas is above a predetermined temperature, means for interrupting the flow of gas into said secondary combustion chamber from said furnace upon the temperature of the wall of said secondary combustion chamber dropping below a predetermined temperature, and means operable upon said interruption of the flow of gases into said secondary combustion chamber for conveying the gases from said gas outlet of the furnace away from the furnace to permit emergency operation of the furnace.